United States Patent
Singh et al.

(10) Patent No.: US 11,198,437 B2
(45) Date of Patent: Dec. 14, 2021

(54) METHOD AND APPARATUS FOR THREAT ZONE ASSESSMENT

(71) Applicant: GM GLOBAL TECHNOLOGY OPERATIONS LLC, Detroit, MI (US)

(72) Inventors: Gurhari Singh, Toronto (CA); Alaeddin Bani Milhim, Ajax (CA); Paul A. Adam, Milford, MI (US); Reza Zarringhalam, Waterloo (CA); Amir Takhmar, Toronto (CA); Mark Gazda, Howell, MI (US); Shaun C. Bowman, Ann Arbor, MI (US); Joseph M. Burdge, West Bloomfield, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 276 days.

(21) Appl. No.: 16/449,822

(22) Filed: Jun. 24, 2019

(65) Prior Publication Data

US 2020/0398848 A1 Dec. 24, 2020

(51) Int. Cl.
| | |
|---|---|
| *B60W 30/18* | (2012.01) |
| *B60W 30/09* | (2012.01) |
| *B60W 30/095* | (2012.01) |
| *G06K 9/00* | (2006.01) |
| *G08G 1/16* | (2006.01) |

(52) U.S. Cl.
CPC ...... *B60W 30/18163* (2013.01); *B60W 30/09* (2013.01); *B60W 30/0956* (2013.01); *G06K 9/00825* (2013.01); *G08G 1/166* (2013.01); *G08G 1/167* (2013.01); *B60W 2554/80* (2020.02); *B60W 2556/65* (2020.02)

(58) Field of Classification Search
CPC .... G08G 1/166; G08G 1/167; G06K 9/00825; B60W 30/09; B60W 30/0956; B60W 2556/65; B60W 2554/80; B60W 30/18163
See application file for complete search history.

(56) References Cited

U.S. PATENT DOCUMENTS

| | | |
|---|---|---|
| 8,874,267 B1 | 10/2014 | Dolgov et al. |
| 9,180,882 B1 | 11/2015 | Dolgov et al. |
| 9,690,269 B2 | 6/2017 | Higashi |

(Continued)

OTHER PUBLICATIONS

Disclosed Anonymously, "Front Blind Zone Indication and Alert", Research Disclosure database No. 660004, Published in Apr. 2019 paper journal, Published digitally Feb. 25, 2019, 2 Pages, Research Disclosure, Questel Ireland Ltd, ISSN 0374-4353.

*Primary Examiner* — Peter D Nolan
*Assistant Examiner* — Demetra R Smith-Stewart
(74) *Attorney, Agent, or Firm* — Cantor Colburn LLP

(57) ABSTRACT

A method and apparatus that perform threat zone assessment in a host vehicle are provided. The method includes detecting a target vehicle in a nonadjacent lane with respect to the host vehicle, determining dimensions of the detected target vehicle, a type of the detected target vehicle, and geometry of a road on which the detected target vehicle and the host vehicle are traveling, calculating the threat zone based on the dimensions of the detected target vehicle, the type of the detected target vehicle, or the geometry of the road on which the detected target vehicle and the host vehicle are traveling, and controlling the host vehicle to avoid the calculated threat zone by accelerating the host vehicle, decelerating the host vehicle, or aborting a lane change by the host vehicle.

18 Claims, 3 Drawing Sheets

(56) References Cited

U.S. PATENT DOCUMENTS

| | | | |
|---|---|---|---|
| 9,701,307 B1* | 7/2017 | Newman | B60W 10/184 |
| 2008/0046150 A1* | 2/2008 | Breed | B60R 21/0134 |
| | | | 701/45 |
| 2014/0207325 A1* | 7/2014 | Mudalige | G05D 1/0212 |
| | | | 701/26 |
| 2015/0353008 A1* | 12/2015 | Kline | G08G 1/162 |
| | | | 340/993 |
| 2018/0362037 A1* | 12/2018 | Ishiwatari | G06K 9/00805 |
| 2019/0315345 A1* | 10/2019 | Newman | B60W 50/14 |
| 2019/0382018 A1* | 12/2019 | Garnault | B60W 60/00272 |
| 2020/0062277 A1* | 2/2020 | Kim | G01S 13/867 |
| 2020/0114886 A1* | 4/2020 | Kim | G01S 17/50 |

* cited by examiner

METHOD AND APPARATUS FOR THREAT ZONE ASSESSMENT

INTRODUCTION

Apparatuses and methods consistent with exemplary embodiments relate to performing lane changes with vehicles. More particularly, apparatuses and methods consistent with exemplary embodiments relate to avoiding blind spots of vehicles during lane changes.

SUMMARY

One or more exemplary embodiments provide a method and an apparatus that calculates a threat zone to be avoided during a lane change. More particularly, one or more exemplary embodiments provide a method and an apparatus that calculate a threat zone created by a target vehicle that is traveling in nonadjacent lane other than the lane of travel of the host vehicle.

According to an aspect of exemplary embodiment, a method that performs threat zone assessment is provided. The method includes detecting at least one target vehicle in a nonadjacent lane other than a lane of travel of the host vehicle, determining one or more from among dimensions of the detected at least one target vehicle, type of the detected at least one target vehicle, and a geometry of a road on which the detected at least one target vehicle and the host vehicle are traveling, calculating the threat zone based on the one or more from among the dimensions of the detected at least one target vehicle, the type of the detected at least one target vehicle, the geometry of the road on which the detected at least one target vehicle and the host vehicle are traveling, and attributes of the at least one target vehicle, and controlling the host vehicle to avoid the calculated threat zone by performing one or more from among accelerating the host vehicle, decelerating the host vehicle, and aborting a lane change of the host vehicle.

The method may also include determining whether the host vehicle will enter the calculated threat zone during a lane change and controlling the host vehicle to perform the lane change if the determining determines that the host vehicle will not be entering the calculated threat zone.

The calculated threat zone may include multiple adjacent lanes between the host vehicle and the detected at least one target vehicle.

The calculating the threat zone may include calculating the threat zone based on two or more from among the dimensions of the detected at least one target vehicle, the type of the detected at least one target vehicle, and the geometry of the road on which the detected at least one target vehicle and the host vehicle are traveling.

The method may include transmitting a signal to the detected at least one target vehicle to indicate a pending lane change of the host vehicle in the calculated threat zone corresponding to the detected at least one target vehicle.

The method may further include determining whether the host vehicle is in a location where the threat zone assessment is active, and the method may be performed in response to determining that the host vehicle is in the location where the threat zone assessment is active.

The attributes of the at least one target vehicle may include one or more from among turn signal status, brake light status, and information received from vehicle to vehicle communication.

The method may also include outputting a notification corresponding to the performing the one or more from among the accelerating the host vehicle, the decelerating the host vehicle, and the aborting a lane change by the host vehicle.

The method may also include receiving an input indicating a lane change into an adjacent lane of on a first side of the host vehicle, and the detecting the at least one target vehicle in the nonadjacent lane is performed on the first side of the host vehicle.

According to an aspect of an exemplary embodiment, an apparatus that performs threat zone assessment is provided. The apparatus includes at least one memory including computer executable instructions and at least one processor configured to read and execute the computer executable instructions. The computer executable instructions causing the at least one processor to detect at least one target vehicle in a nonadjacent lane other than a lane of travel of the host vehicle, determine one or more from among dimensions of the at least one target vehicle, type of the at least one target vehicle, geometry of the road on which the detected at least one target vehicle and the host vehicle are traveling, and attributes of the at least one target vehicle, calculate the threat zone based on the one or more from among the dimensions of the detected at least one target vehicle, the type of the detected at least one target vehicle, and the geometry of the road on which the detected at least one target vehicle and the host vehicle are traveling, and control the host vehicle to avoid the calculated threat zone by performing one or more from among accelerating the host vehicle, decelerating the host vehicle, and aborting a lane change of the host vehicle.

The computer executable instructions may further cause the at least one processor to determine whether the host vehicle will enter the calculated threat zone during a lane change and control the host vehicle to perform the lane change if the determining determines that the host vehicle will not be entering the calculated threat zone.

The threat zone may include multiple adjacent lanes between the host vehicle and the detected at least one target vehicle.

The computer executable instructions may further cause the at least one processor to calculate the threat zone based on two or more from among the dimensions of the detected at least one target vehicle, the type of the detected at least one target vehicle, and the geometry of the road on which the detected at least one target vehicle and the host vehicle are traveling.

The computer executable instructions may further cause the at least one processor to control to transmit a signal to the detected at least one target vehicle to indicate a pending lane change of the host vehicle in the calculated threat zone corresponding to the detected at least one target vehicle.

The computer executable instructions may cause the at least one processor to determine whether the host vehicle is in a location where the threat zone assessment is active and detect at least one target vehicle if the processor determines that the host vehicle is in the location where the threat zone assessment is active.

The attributes of the at least one target vehicle may include one or more from among turn signal status, brake light status, and information received from vehicle to vehicle communication.

The computer executable instructions may further cause the at least one processor to output a notification corresponding to the performing the one or more from among the accelerating the host vehicle, the decelerating the host vehicle, and the aborting a lane change by the host vehicle.

The computer executable instructions may further cause the at least one processor to receive an input indicating a lane change into an adjacent lane of on a first side of the host vehicle and detect the at least one target vehicle in the nonadjacent lane on the first side of the host vehicle.

The apparatus may further include a sensor including one or more from among a camera, a lidar sensor, a radar sensor, and an ultrasonic sensor, and the computer executable instructions may cause the at least one processor to detect the at least one target vehicle in the nonadjacent lane with respect to the host vehicle based on information provided by the sensor.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
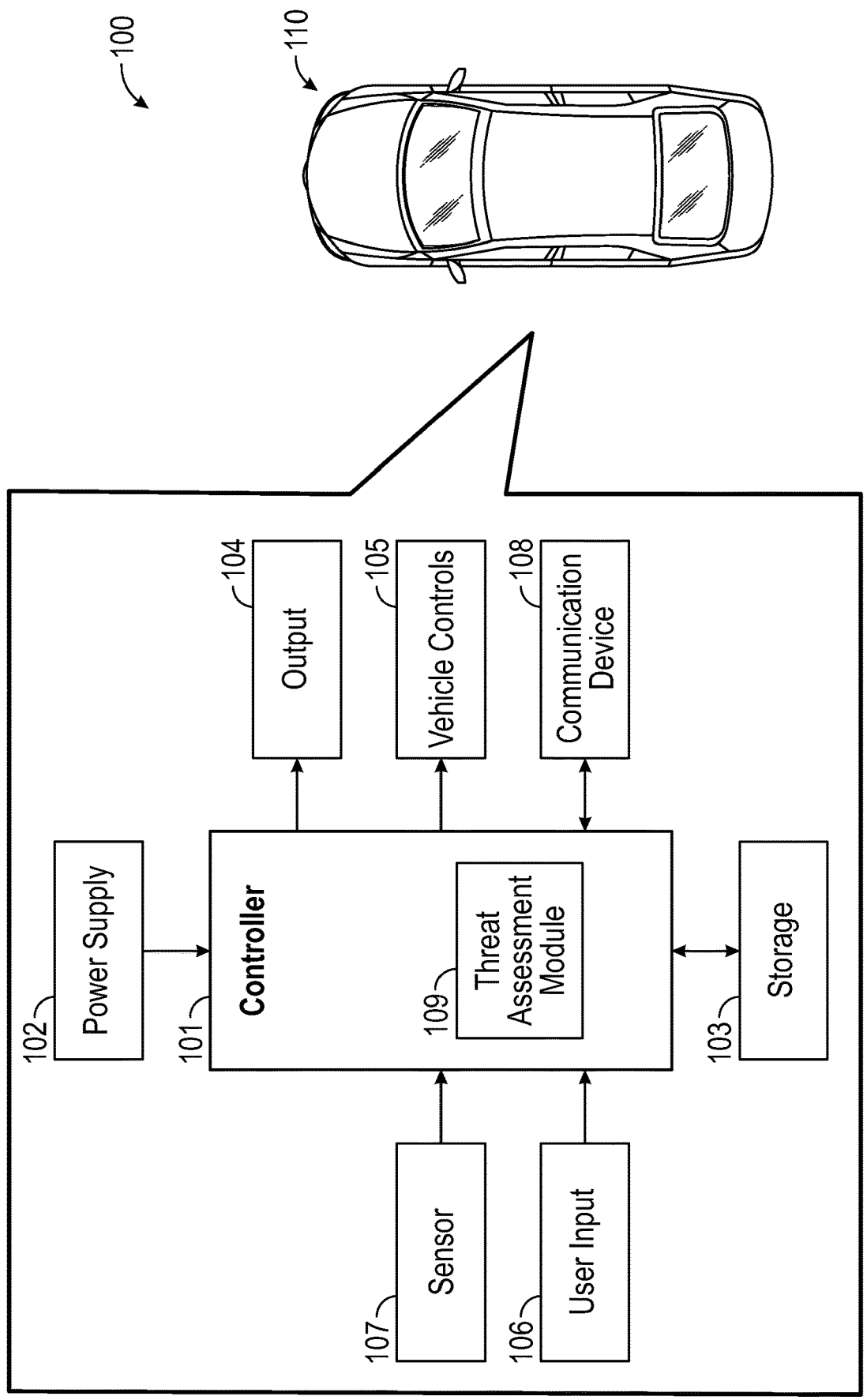
FIG. 1 shows a block diagram of an apparatus performs threat zone assessment according to an exemplary embodiment.

An apparatus and method that perform threat assessment will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are being equipped with automated driving capabilities enabled by sensors that are capable of providing information to determine a position of a host vehicle, target vehicles, target objects, or target obstacles, and conditions of an environment around a vehicle. The automated driving capabilities may drive a vehicle or perform maneuvers such as lane changes or blind spot avoidance.

While preparing to perform a lane change, the host vehicle may check to determine if it is safe to move into an adjacent lane or target lane. Generally, this check determines the positions, speeds, and/or accelerations of target objects in adjacent lanes and whether there is enough space to execute the maneuvers. In certain circumstances, the check performed by a host vehicle may indicate it is safe to move into an adjacent lane and a host vehicle may move into the adjacent lane. However, the host vehicle does not usually account for blind spots of vehicles that are in nonadjacent lanes, e.g., the second or third lane over from the host vehicle.

Although target vehicles in nonadjacent lanes are not generally a threat to the lane change of the host vehicle, there may be a situation where the host vehicle is performing a lane change into the blind spot of the target vehicle in the nonadjacent lane and a driver of the target vehicle does not see the host vehicle entering the blind spot. This situation may lead to the target vehicle attempting to move into the lane that the host vehicle is entering and cause the potential for a collision.

One way to address the of maneuvering into the blind spot of target vehicles in nonadjacent lanes is detect the vehicles in the nonadjacent lanes and account for there blind spots via a threat assessment. In areas where the threat assessment is possible or appropriate, e.g. three or four lane highways, the threat assessment may involve detecting dimensions or types target vehicles traveling in nonadjacent lanes and calculating a threat zone corresponding to the blind spot of the target vehicles corresponding to the lanes between the target vehicles and host vehicle. The lane change may then be performed by moving the vehicle, so it changes lanes into an area that is not within the threat zone or the lane change may be aborted in situations where the threat zone is not avoidable. In other aspects, the threat zone may be weighed as one parameter in carrying out the determination of whether to perform the lane change.

FIG. 1 shows a block diagram of an apparatus that performs threat zone assessment 100. As shown in FIG. 1, the apparatus that performs threat zone assessment 100, according to an exemplary embodiment, includes a controller 101, a power supply 102, a storage 103, an output 104, vehicle controls 105, a user input 106, a sensor 107, and a communication device 108. However, the apparatus that performs threat zone assessment 100 is not limited to the aforementioned configuration and may be configured to include additional elements and/or omit one or more of the aforementioned elements. The apparatus that performs threat zone assessment 100 may be implemented as part of a vehicle 110, as a standalone component, as a hybrid between an on vehicle and off vehicle device, or in another computing device.

The controller 101 controls the overall operation and function of the apparatus that performs threat zone assessment 100. The controller 101 may control one or more of a storage 103, an output 104, vehicle controls 105, a user input 106, a sensor 107, and a communication device 108 of the apparatus that performs threat zone assessment 100. The controller 101 may include one or more from among a processor, a microprocessor, a central processing unit (CPU), a graphics processor, Application Specific Integrated Circuits (ASICs), Field-Programmable Gate Arrays (FP- GAs), state machines, circuitry, and a combination of hardware, software and firmware components. The controller 101 may be programmed with a threat detection module 109. The threat detection module 109 may be programmed to perform the functions of the threat assessment apparatus 109.

The controller 101 is configured to send and/or receive information from one or more of the storage 103, the output 104, the vehicle controls 105, the user input 106, the sensor 107, and the communication device 108 of the apparatus that performs threat zone assessment 100. The information may be sent and received via a bus or network, or may be directly read or written to/from one or more of the storage 103, the output 104, the user input 106, the sensor 107, and the communication device 108 of the apparatus that performs threat zone assessment 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the vehicle controls 105, the user input 106, the sensor 107, and the communication device 108, of the apparatus that performs threat zone assessment 100. The power supply 102 may include one or more from among a battery, an outlet, a capacitor, a solar energy cell, a generator, a wind energy device, an alternator, etc.

The storage 103 is configured for storing information and retrieving information used by the apparatus that performs threat zone assessment 100. The storage 103 may be controlled by the controller 101 to store and retrieve information received from the controller 101, the vehicle controls 105, the sensor 107, and/or the communication device 108. The information may include dimensions of a target vehicle, a type of a target vehicle, information corresponding to the threat zone, information about road geometry, and mapping information. The storage 103 may also store the computer instructions configured to be executed by a processor to perform the functions of the apparatus that performs threat zone assessment 100.

The type of target vehicle may be one of a semi-truck, a car, a sport utility vehicle, a motorcycle, an emergency vehicle, a bicycle, etc. The dimensions of the target vehicle may include a height, a width and a length of the target vehicle. The geometry of the road may include coordinates corresponding to the curvature or shape of the road and may be derived from mapping information. The information corresponding to the threat zone may include one or more form among a shape of the threat zone, a size of the threat zone, coordinates of the threat zone, and information identifying lanes included in the threat zone and the indicating the number of lanes in the threat zone.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that performs threat zone assessment 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output a notification including one or more from among an audible notification, a light notification, and a display notification. The notifications may indicate information on whether it is safe to execute a vehicle maneuver, for example a lane change maneuver. In addition, the notification may provide a notification of when the vehicle maneuver is aborted due to a threat zone assessment or notification of that the host vehicle is moving to avoid the threat zone.

The vehicle controls 105 may include vehicle system modules (VSMs) in the form of electronic hardware components that are located throughout the vehicle and typically receive input from one or more sensors and use the sensed input to perform diagnostic monitoring, control the vehicle to perform maneuvers, accelerate, brake, decelerate, report and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions.

As examples, one VSM can be an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, another VSM can be the vehicle dynamics sensor that detects a steering wheel angle parameter, a speed parameter, an acceleration parameter, a lateral acceleration parameter, and/or a road wheel angle parameter, and another VSM can be a body control module that governs various electrical components located throughout the vehicle, like the vehicle's power door locks and headlights. As is appreciated by those skilled in the art, the above-mentioned VSMs are only examples of some of the modules that may be used in a vehicle, as numerous others are also available.

The user input 106 is configured to provide information and commands to the apparatus that performs threat zone assessment 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104 or activate and deactivate the apparatus that performs the threat assessment 109.

The sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. The sensor 107 may be configured to scan an area around a vehicle to detect and provide imaging information including an image of the area around the vehicle. The imaging information may include brake light status of a target vehicle or turn signal indicator of a target vehicle. The sensor 107 may be used to compile imaging information, high resolution mapping information or image or map data including three-dimensional point cloud information.

The communication device 108 may be used by the apparatus that performs threat zone assessment 100 to communicate with various types of external apparatuses according to various communication methods. The communication device 108 may be used to send/receive information including the information on a location of a vehicle, global navigation information, and/or image sensor information.

The communication device 108 may include various communication modules such as one or more from among a telematics unit, a broadcast receiving module, a near field communication (NFC) module, a GNS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GNS receiver is a module that receives a GNS signal from a GPS satellite or other navigation satellite or tower and that detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that performs threat zone assessment 100 may be configured to detect at least one target vehicle in a nonadjacent lane other than a lane of travel of the host vehicle, determine one or more from among dimensions of the detected at least one target vehicle, type of the detected at least one target vehicle, and geometry of a road on which the detected at least one target vehicle and the host vehicle are traveling, calculate the threat zone based on the one or more from among the dimensions of the detected at least one target vehicle, the type of the detected at least one target vehicle, and the geometry of the road on which the detected at least one target vehicle and the host vehicle are traveling, and control the host vehicle to avoid the calculated threat zone by performing one or more from among accelerating the host vehicle, decelerating the host vehicle, and aborting a lane change by the host vehicle.

More specifically, the threat assessment module 109 of the controller 101 may be configured to determine one or more from among dimensions of the detected at least one target vehicle, type of the detected at least one target vehicle, and geometry of a road on which the detected at least one target vehicle and the host vehicle are traveling; and to calculate the threat zone based on the one or more from among the dimensions of the detected at least one target vehicle, the type of the detected at least one target vehicle, and the geometry of the road on which the detected at least one target vehicle and the host vehicle are traveling. In addition, the threat assessment module 109 may be configured to determine whether a pending maneuver of the host vehicle will enter the threat zone and output the result of the determination. The threat zone may include multiple adjacent lanes between the host vehicle and the detected at least one target vehicle.

The controller 101 of the apparatus that performs threat zone assessment 100 may be further configured to determine whether the host vehicle will enter the calculated threat zone during a lane change and control the host vehicle to perform the lane change if the determining determines that the host vehicle will not be entering the calculated threat zone.

The controller 101 of the apparatus that performs threat zone assessment 100 may be further configured to calculate the threat zone based on two or more from among the dimensions of the detected at least one target vehicle, the type of the detected at least one target vehicle, and the geometry of the road on which the detected at least one target vehicle and the host vehicle are traveling.

The controller 101 of the apparatus that performs threat zone assessment 100 may be further configured to control to transmit a signal to the detected at least one target vehicle to indicate a pending lane change of the host vehicle in the calculated threat zone corresponding to the detected at least one target vehicle.

The controller 101 of the apparatus that performs threat zone assessment 100 may be further configured to determine whether the host vehicle is in a location where the threat zone assessment is active and detect at least one target if the processor determines that the host vehicle is in the location where the threat zone assessment is active.

The controller 101 of the apparatus that performs threat zone assessment 100 may be further configured to control to output a notification corresponding to the performing the one or more from among the accelerating the host vehicle, the decelerating the host vehicle, and the aborting a lane change by the host vehicle.

The controller 101 of the apparatus that performs threat zone assessment 100 may be further configured to receive an input indicating a lane change into an adjacent lane of on a first side of the host vehicle, and detect the at least one target vehicle in the nonadjacent lane on the first side of the host vehicle.

Figure 2:
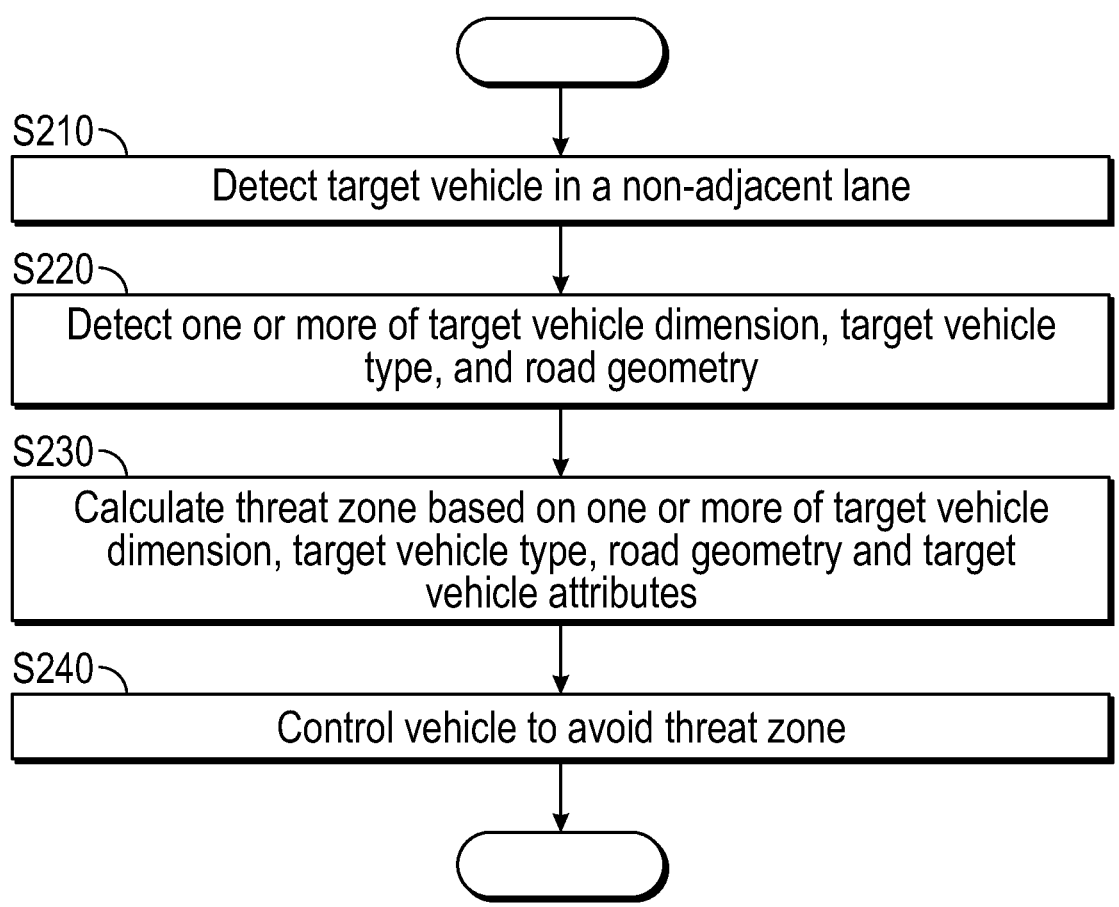
FIG. 2 shows a flowchart for a method that performs threat zone assessment according to an exemplary embodiment.

FIG. 2 shows a flowchart for a method that performs threat zone assessment according to an exemplary embodiment. The method of FIG. 2 may be performed by the apparatus that performs threat zone assessment 100 or may be encoded into a computer readable medium as instructions that are executable by a computer to perform the method.

Referring to FIG. 2, at least one target vehicle in a nonadjacent lane other than a lane of travel of the host vehicle is detected in operation S210. Detecting the target vehicle may be performed via information provided by a sensor.

In operation S220, one or more from among dimensions of the detected at least one target vehicle, type of the detected at least one target vehicle, and geometry of a road on which the detected at least one target vehicle and the host vehicle are traveling are determined. For example, the type of target vehicle may be one of a semi-truck, a car, a sport utility vehicle, a motorcycle, a bicycle, etc., and may be determined via image detection or shape detection from information provided by sensors. The dimensions of the target vehicle may include a height, a width and a length of the target vehicle and may also be detected using information provided by the sensors. The geometry of the road may include coordinates corresponding to the curvature or shape of the road and may be determined from mapping information or information provided by the sensors.

In operation S230, the threat zone is calculated based on the one or more from among the dimensions of the detected at least one target vehicle, the type of the detected at least one target vehicle, the geometry of the road on which the detected at least one target vehicle and the host vehicle are traveling, target vehicle attributes such as turn signal status, brake light status, or information about the target vehicle received via communication device 108. The calculated threat zone may include information such as one or more form among a shape of the threat zone, a size of the threat zone, coordinates of the threat zone, and information identifying lanes included in the threat zone and the indicating the number of lanes in the threat zone.

Then, in operation S240, the host vehicle is controlled to avoid the calculated threat zone by performing one or more from among accelerating the host vehicle, decelerating the host vehicle, and aborting a lane change of the host vehicle. The host vehicle may be controlled by sending commands or information of the vehicle action designed to avoid the threat zone to one or more vehicle controls.

Figure 3:
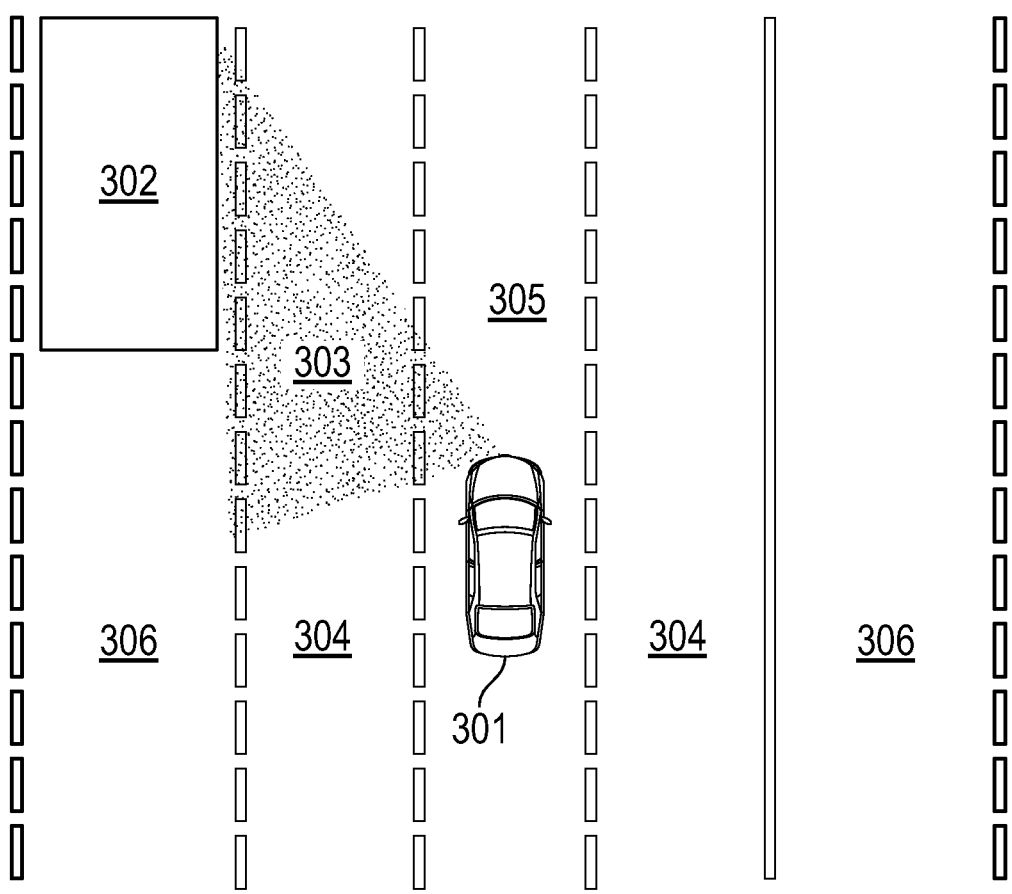
FIG. 3 shows an illustration of a threat zone created by vehicle traveling in a nonadjacent lane other than a lane of travel of the host vehicle according to an aspect of an exemplary embodiment.

FIG. 3 shows an illustration of a threat zone created by vehicle traveling in a nonadjacent lane other than a lane of travel of the host vehicle according to an aspect of an exemplary embodiment.

Referring to FIG. 3, a host vehicle 301 is traveling in a center lane 305 while a target vehicle 302 is traveling in a nonadjacent lane 306. In particular, the target vehicle 302 is traveling two lanes over on the left side of the host vehicle 301. The target vehicle 302 in this example may be a truck. The adjacent lane 304 between the target vehicle 302 and the host vehicle 301 is clear and the host vehicle 301 may determine to move into the adjacent lane 304 via automated driving controls. However, this determination may not consider the moves of target vehicle 302 or the blind spot of target vehicle 302.

A host vehicle 301, according to an exemplary embodiment, considers the type or dimensions of target vehicle 302 when it travels in a nonadjacent lane 306 to calculate a threat zone 303 in the lanes between the host vehicle 301 and the target vehicle 302. Moreover, the size and shape of this threat zone 303 may be varied depending on the geometry of the road on which the vehicles are traveling. By determining the threat zone 303 created by target vehicle 302, the host vehicle may maneuver to avoid the threat zone 303 or may abort or cancel a lane change maneuver into the threat zone 303, thereby decreasing the potential for a collision.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method of controlling a host vehicle, the method comprising:
   detecting a target vehicle in a nonadjacent lane other than a lane of travel of the host vehicle;
   determining one or more of a dimension of the target vehicle, a type of the target vehicle, and a geometry of a road on which the target vehicle and the host vehicle are traveling;
   calculating coordinates of a blind spot of the target vehicle based on the one or more of the dimension of the target vehicle, the type of the target vehicle, the geometry of the road on which the target vehicle and the host vehicle are traveling, and an attribute of the target vehicle, wherein the blind spot is located in an adjacent lane between the lane of travel and the non-adjacent lane; and
   controlling the host vehicle to perform one or more of accelerating the host vehicle, decelerating the host vehicle, and aborting a lane change of the host vehicle to avoid the blind spot.

2. The method of claim 1, further comprising:
   determining whether the host vehicle will enter the blind spot during a lane change; and
   controlling the host vehicle to perform the lane change when the host vehicle is not determined to be entering the blind spot during the lane change.

3. The method of claim 1, wherein the blind spot includes multiple adjacent lanes between the host vehicle and the target vehicle.

4. The method of claim 1, further comprising calculating the blind spot based on two or more of the dimension of the target vehicle, the type of the detected at least one target vehicle, and the geometry of the road on which the target vehicle and the host vehicle are traveling.

5. The method of claim 1, further comprising transmitting a signal to the target vehicle to indicate a pending lane change of the host vehicle into the blind spot of the target vehicle.

6. The method of claim 1, wherein the attribute of the target vehicle comprises one or more from among a turn signal status, a brake light status, and information received from vehicle to vehicle communication.

7. The method of claim 1, further comprising outputting a notification corresponding to performing the one or more of accelerating the host vehicle, the decelerating the host vehicle, and aborting the lane change by the host vehicle.

8. The method of claim 1, further comprising receiving an input indicating a lane change into the adjacent lane.

9. A non-transitory computer readable medium comprising computer instructions executable to perform the method of claim 1.

10. An apparatus that controls a host vehicle, the apparatus comprising:
    at least one memory comprising computer executable instructions; and at least one processor configured to read and execute the computer executable instructions, the computer executable instructions causing the at least one processor to:

detect a target vehicle in a nonadjacent lane other than a lane of travel of the host vehicle;

determine one or more of a dimension of the target vehicle, a type of the at least one target vehicle, and a geometry of a road on which the target vehicle and the host vehicle are traveling, and attributes of the at least one target vehicle;

calculate coordinates of a blind spot of the target vehicle based on the one or more of the dimension of the target vehicle, the type of the target vehicle, the geometry of the road on which the target vehicle and the host vehicle are traveling, and an attribute of the target vehicle, wherein the blind spot is located in an adjacent lane between the lane of travel and the non- adjacent lane; and control the host vehicle to avoid the blind spot by performing one or more of accelerating the host vehicle, decelerating the host vehicle, and aborting a lane change of the host vehicle.

11. The apparatus of claim 10 wherein the computer executable instructions further causes the at least one processor to determine whether the host vehicle will enter the blind spot during a lane change and control the host vehicle to perform the lane change when the host vehicle is not determined to be entering the blind spot during the lane change.

12. The apparatus of claim 10, wherein the blind spot includes multiple adjacent lanes between the host vehicle and the target vehicle.

13. The apparatus of claim 10, wherein the computer executable instructions further causes the at least one processor to calculate the blind spot based on two or more of the dimension of the target vehicle, the type of the target vehicle, and the geometry of the road on which the target vehicle and the host vehicle are traveling.

14. The apparatus of claim 10, wherein the computer executable instructions further causes the at least one processor to control to transmit a signal to the target vehicle to indicate a pending lane change of the host vehicle into the blind spot of the target vehicle.

15. The apparatus of claim 10, wherein the attribute of the target vehicle comprises one or more of a turn signal status, a brake light status, and information received from vehicle to vehicle communication.

16. The apparatus of claim 10, wherein the computer executable instructions further causes the at least one processor to output a notification corresponding to performing the one or more of accelerating the host vehicle, decelerating the host vehicle, and aborting the lane change by the host vehicle.

17. The apparatus of claim 10, wherein the computer executable instructions further causes the at least one processor to receive an input indicating a lane change into the adjacent lane.

18. The apparatus of claim 10, further comprising a sensor, wherein the sensor comprises one from among a camera, a lidar sensor, a radar sensor, and an ultrasonic sensor, wherein the computer executable instructions cause the at least one processor to detect the target vehicle in the nonadjacent lane with respect to the host vehicle based on information provided by the sensor.

* * * * *